United States Patent
Lukac

(10) Patent No.: US 8,019,071 B2
(45) Date of Patent: Sep. 13, 2011

(54) DISTRIBUTED CONFERENCING VIA PBX-CONFERENCE BRIDGE LINK

(75) Inventor: Tibor Lukac, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1270 days.

(21) Appl. No.: 11/656,704

(22) Filed: Jan. 22, 2007

(65) Prior Publication Data

US 2008/0175366 A1    Jul. 24, 2008

(51) Int. Cl.
*H04M 3/56* (2006.01)

(52) U.S. Cl. ............. 379/204.01; 379/202.01; 370/260; 370/352

(58) Field of Classification Search ............. 379/202.01, 379/204.01

See application file for complete search history.

(56) References Cited

U.S. PATENT DOCUMENTS

| | | | | |
|---|---|---|---|---|
| 5,563,882 A * | 10/1996 | Bruno et al. | ................. | 370/260 |
| 6,236,644 B1 * | 5/2001 | Shuman et al. | ............... | 370/261 |
| 6,801,612 B2 * | 10/2004 | Malcolm et al. | ......... | 379/202.01 |
| 2003/0125954 A1 * | 7/2003 | Bradley et al. | ............... | 704/270 |
| 2004/0006595 A1 * | 1/2004 | Yeh et al. | ...................... | 709/204 |
| 2007/0111743 A1 * | 5/2007 | Leigh et al. | .................. | 455/518 |

* cited by examiner

*Primary Examiner* — Quynh H Nguyen
*Assistant Examiner* — Jirapon Intavong
(74) *Attorney, Agent, or Firm* — Chapin IP Law, LLC

(57) ABSTRACT

A method, apparatus and computer program product for performing distributed conferencing is presented. A Public Branch Exchange (PBX) receives a plurality of calls intended for a conference bridge from a plurality of conference participants. The plurality of conference participants is conferenced together at the PBX. The plurality of conference participants is connected to the conference bridge by way of a single connection from the PBX to the conference bridge.

20 Claims, 4 Drawing Sheets

DISTRIBUTED CONFERENCING VIA PBX-CONFERENCE BRIDGE LINK

BACKGROUND

Teleconferencing can be defined as the real-time exchange of information between people who are not in the same physical space. Teleconferencing utilizes a conference call which is a telephone call in which three or more people converse simultaneously. Many companies use conference calls as a meeting tool or to distribute information to a large number of listeners at the same time. The two main types are MeetMe conferencing, in which each participant dials one number, and ad hoc conferencing, in which a moderator calls each participant.

Conventional conference calls connect people through a conference bridge, which is essentially a server that acts like a telephone and can answer multiple calls simultaneously. Software plays a large role in whether the bridge has capabilities beyond simply connecting multiple callers. A company can have its own bridge or can contract with a service provider for conference call hosting. Providers frequently offer add-on features for conference calls, such as attendee polling, call recording and in-call operators or attendants. Companies using Voice over IP (VoIP) telephones can also host conference calls themselves if the VoIP software supports them.

Many phone conferencing systems require a login and personal identification number (PIN) to access the system. This helps protect confidential and proprietary information during the call.

In the past few years, corporations have gotten bigger and more spread out. Many American employees (more than 44 million in 2004) also do at least some of their work from home. Since offices and employees can be thousands of miles apart, getting everyone into the same room for meetings and training has become decidedly impractical for a lot of companies. This is one of the reasons teleconferencing has become such a popular industry. Through teleconferencing, companies can conduct meetings, customer briefs, training, demonstrations and workshops by phone or online instead of in person.

The simplest phone teleconference is a three-way call, available in many homes as a service from the telephone company. Another very simple (but not necessarily effective) method is to have two groups of people talk to one another via speakerphone. The limits of three-way calling and the sound quality of speakerphones make both of these options impractical for most businesses.

Videophones can add a visual element to conference calls, but businesses often need to share other visual information. Web conferencing allows people to communicate through text and video in addition to audio. The simplest web conferencing methods use chat and instant messaging programs to host text-based group discussions. More sophisticated programs exchange visual information with webcams and streaming video. Some web conferencing applications allow people to share documents online.

Companies can either purchase conferencing software and host their meetings themselves or use a hosting service. Hosting services provide the software and server space on which to conduct meetings. Either way, the company or the hosting service must have software to coordinate the meeting as well as ample server space and bandwidth to accommodate the meeting. Web conferencing programs combine tools already common to web pages and Internet communication. These tools are bundled into one interface to create an interactive meeting environment. These tools include HyperText Markup Language (HTML), eXtensible Markup Language (XML), Application Service Provider (ASP) markup, Java scripts, flash animation, Instant Messaging (IM) and streaming audio and video.

Some programs are entirely computer- and Internet-based. Others use the telephone system to distribute audio content. To participate in the online meetings, participants must have a computer, an Internet connection and a telephone, if audio content is not provided online. If the conferencing program relies on Internet-based audio chat and webcam feeds, the participants' computers should have a microphone, a webcam and a video capture card.

In general, every online presentation or meeting has a moderator and attendees. The moderator sets the time and date of the meeting, prepares the content and makes sure everything works properly before the meeting begins. Attendees can either view the presentation without giving feedback or can collaborate, based on the settings and capabilities of the programs. Often, moderators can record the presentation for later viewing and can pass their moderator capabilities to attendees during the meeting.

SUMMARY

Conventional mechanisms such as those explained above suffer from a variety of deficiencies. Conventional teleconferencing applications require each user to call in to a conference bridge. This can result in the utilization of several Public switched Telephone Network (PSTN) lines and sets of ports, especially if a large number of participants are calling into the conference bridge.

Embodiments of the invention significantly overcome such deficiencies and provide mechanisms and techniques that provide distributed conferencing via a PBX-conference bridge link. This provides advantages over existing solutions (which require all participants to dial into a conference bridge through a separate port on the bridge) by savings in ports as well as potentially trunks/circuits. By utilizing the PBX to conference local parties, only one port is tied up on the conference bridge itself rather than one per caller. Since only one call is extended out to the conference bridge from a local site, this may also result in toll (call) savings as well.

The PBX's conference bridge is made aware in such as way so the PBXs can handle some subset of conference needs without all parties needing to connect directly to the conference bridge (i.e. through a separate port on the bridge). If multiple callers are calling into the same meeting/conference on the same bridge (a common occurrence), then the PBX filters these calls and performs some subset of the conferencing of those parties locally (thereby saving on trunk and conference bridge resources). The PBX also has an "intelligent link" to the conference server/bridge to inform the bridge of callers added to a conference locally (i.e. without actually extending a separate call to the bridge). If the conference is one hundred percent local, no call actually needs to be made into the conference bridge, as the PBX will be used for the conference (if any conference features are invoked, such as recording, then the PBX could be made intelligent enough to add the bridge to the conference). The presently disclosed solution of utilizing the PBX for local conferencing needs efficiently reuses resources in the PBX that are already designed to support conferencing functions. Alternate distributed conferencing solutions don't take advantage of the existing PBX resources.

In a particular embodiment of a method for performing distributed conferencing, the method includes receiving, at a Public Branch Exchange (PBX), a plurality of calls intended for a conference bridge from a plurality of conference participants. The method further includes conferencing the plurality of conference participants at the PBX and connecting the plurality of conference participants to the conference bridge by way of a single connection from the PBX to the conference bridge.

Other embodiments include a computer readable medium having computer readable code thereon for performing distributed conferencing. The computer readable medium includes instructions for receiving, at a Public Branch Exchange (PBX), a plurality of calls intended for a conference bridge from a plurality of conference participants. The computer readable medium also includes instructions for conferencing the plurality of conference participants at the PBX, and instructions for connecting the plurality of conference participants to the conference bridge by way of a single connection from the PBX to the conference bridge.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides distributed conferencing as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing distributed conferencing as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
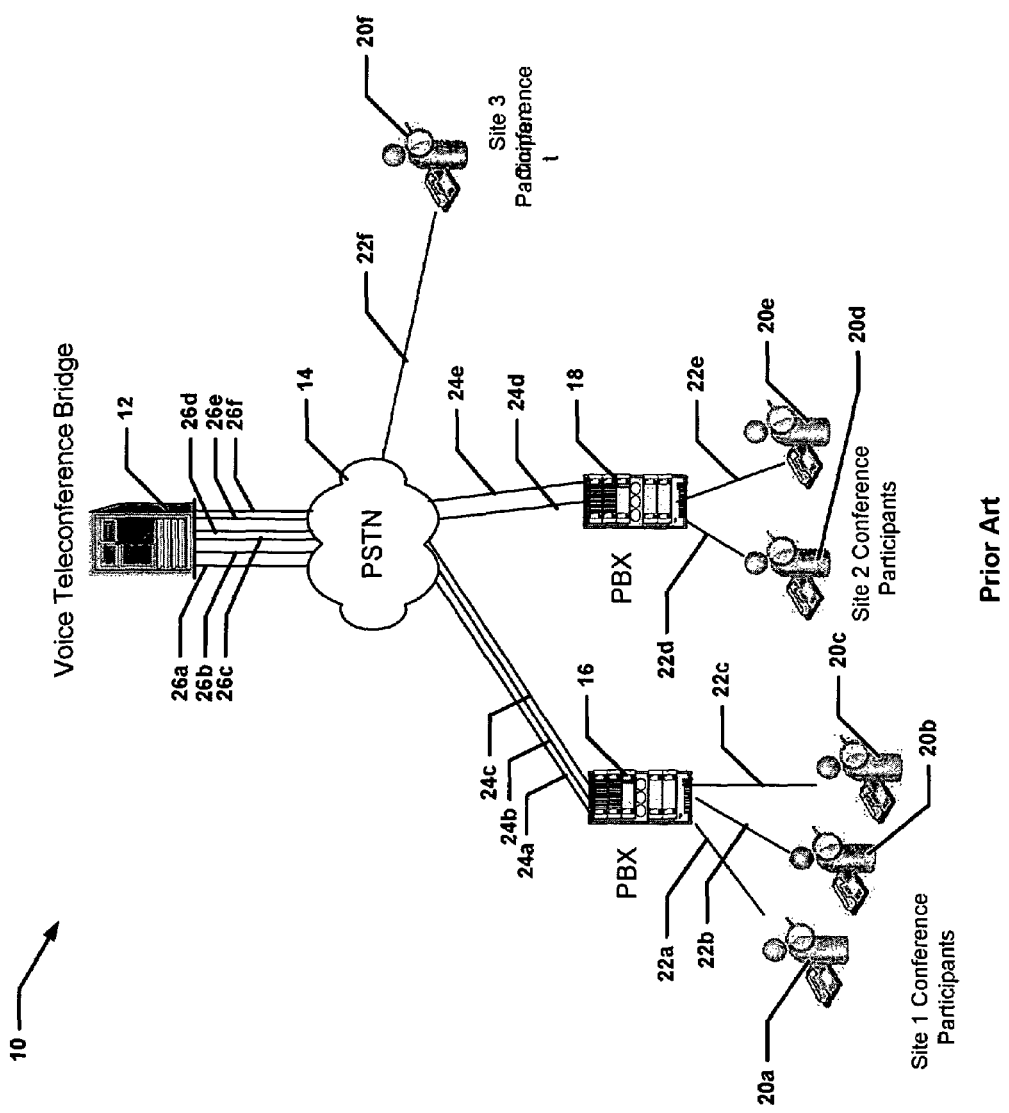
FIG. 1 depicts a prior art teleconferencing system.

Referring now to FIG. 1, a prior art teleconferencing environment 10 is shown. The teleconferencing environment 10 includes a Voice Teleconference bridge 12 in communication with a PSTN 14. A first PBX 16 and a second PBX 18 are also in communication with PSTN 14. Also shown is a plurality of conference participants 20a-20f.

In an example operation, conference participants 20a-20f intend to dial into Voice Teleconference bridge 12 to participate in a teleconference. Site 1 participant 20a connected to PBX 16 by way of line 22a dials the number for the conference. From first PBX 16, the call is routed to PSTN 14 by way of trunk circuit 24a. From PSTN 14 to Voice Teleconference bridge 12, the call is routed along trunk circuit 26a. Site 1 participant 20a is now in communication with teleconference bridge 12 by way of line 22a, and trunk circuits 24a and 26a.

Site 1 participant 20b connected to PBX 16 by way of line 22b dials the number for the conference. From first PBX 16, the call is routed to PSTN 14 by way of trunk circuit 24b. From PSTN 14 to Voice Teleconference bridge 12, the call is routed along trunk circuit 26b. Site 1 participant 20b is now in communication with teleconference bridge 12 by way of line 22b, and trunk circuits 24b and 26b and is able to communicate with site 1 participant 20a.

Similarly, Site 1 participant 20c connected to PBX 16 by way of line 22c dials the number for the conference. From first PBX 16, the call is routed to PSTN 14 by way of trunk circuit 24c. From PSTN 14 to Voice Teleconference bridge 12, the call is routed along trunk circuit 26c. Site 1 participant 20c is now in communication with teleconference bridge 12 by way of line 22c, and trunk circuits 24c and 26c and is able to communicate with site 1 participant 20a and site 1 participant 20b.

Site 2 participant 20d connected to PBX 18 by way of line 22d dials the number for the conference. From second PBX 18, the call is routed to PSTN 14 by way of trunk circuit 24d. From PSTN 14 to Voice Teleconference bridge 12, the call is routed along trunk circuit 26d. Site 2 participant 20d is now in communication with teleconference bridge 12 by way of line 22*d* and trunk circuits 24*d* and 26*d* and is able to communicate with site 1 participants 20*a*, 20*b* and 20*c*.

In a similar manner Site 2 participant 20*e* connected to PBX 18 by way of line 22*e* dials the number for the conference. From second PBX 18, the call is routed to PSTN 14 by way of trunk circuit 24*e*. From PSTN 14 to Voice Teleconference bridge 12, the call is routed along trunk circuit 26*e*. Site 2 participant 20*e* is now in communication with teleconference bridge 12 by way of line 22*e* and trunk circuits 24*e* and 26*e* and is able to communicate with site 1 participants 20*a*, 20*b* and 20*c* and site 2 participant 20*d*.

Site 3 participant 20*f* dials the number for the conference and is routed to PSTN 14 by way of line 22*f*. From PSTN 14 to Voice Teleconference bridge 12, the call is routed along trunk circuit 26*f*. Site 3 participant 20*f* is now in communication with teleconference bridge 12 by way of line 22*f* and trunk circuit 26*f* and is able to communicate with site 1 participants 20*a*, 20*b* and 20*c* as well as site 2 participants 20*d* and 20*e*.

Each conference participant 20*a*-20*f* establishes a respective trunk circuit to the PSTN 14 and another respective trunk circuit from PSTN 14 to voice teleconference bridge 12. This requires a large number of PSTN lines and sets of ports to interconnect the conference participants to the voice teleconference bridge.

Figure 2:
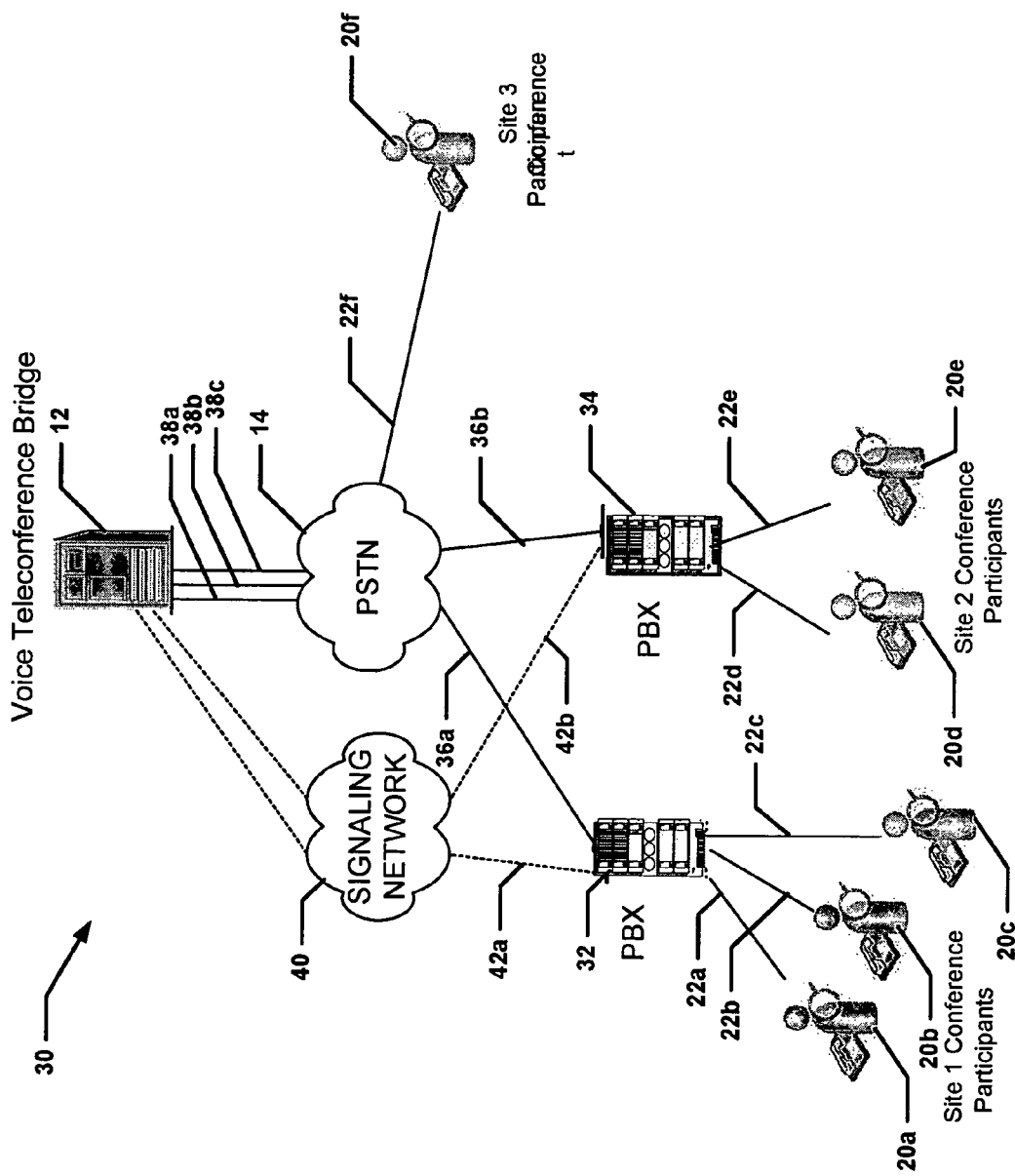
FIG. 2 depicts a teleconferencing system for performing distributed conferencing in accordance with embodiments of the invention.

Referring now to FIG. 2 an example teleconferencing environment 30 in accordance with embodiments of the present invention is shown. The teleconferencing environment 30 includes a Voice Teleconference bridge 12 in communication with a PSTN 14. A first PBX 32 and a second PBX 34 are also in communication with PSTN 14. Also shown are pluralities of conference participants 20*a*-20*f*.

In an example operation, conference participants 20*a*-20*f* intend to dial into Voice Teleconference bridge 12 to participate in a teleconference. Site 1 participant 20*a* connected to PBX 18 by way of line 22*a* dials the number for the conference. Site 1 participant 20*b* connected to PBX 32 by way of line 22*e* dials the number for the conference. Site 1 participant 20*c* connected to PBX 32 by way of line 22*e* dials the number for the conference.

The first PBX 32 receives the plurality of calls intended for a conference bridge 12 from the plurality of conference participants 20*a*-20*c* and conferences the plurality of conference participants 20*a*-20*c* at the PBX 32. From first PBX 32, the call is routed to PSTN 14 by way of a single trunk circuit 36*a*. From PSTN 14 to Voice Teleconference bridge 12, the call is routed along a single trunk circuit 38*a*. Site 1 participants 20*a*, 20*b* and 20*c* are now in communication with teleconference bridge 12 by way of lines 22*a*, 22*b* and 22*c* and trunk circuits 36*a* and 38*a*.

The second PBX 34 receives the plurality of calls intended for a conference bridge 12 from the plurality of conference participants 20*d* and 20*e* by way of lines 22*d* and 22*e* and conferences the plurality of conference participants 20*d* and 20*e* at the PBX 34. From second PBX 34, the call is routed to PSTN 14 by way of a single trunk circuit 36*b*. From PSTN 14 to Voice Teleconference bridge 12, the call is routed along a single trunk circuit 38*b*. Site 2 participants 20*d* and 20*e* are now in communication with teleconference bridge 12 by way of lines 22*d* and 22*e* and by trunk circuits 36*b* and 38*b* and are able to communicate with conference participants 20*a*, 20*b* and 20*c*.

Site 3 participant 20*f* dials the number for the conference and is routed to PSTN 14 by way of line 22*f*. From PSTN 14 to Voice Teleconference bridge 12, the call is routed along 1 trunk circuit 38*c*. Site 3 participant 20*f* is now in communication with teleconference bridge 12 by way of line 22*f* and trunk circuit 38*c* and is able to communicate with site 1 participants 20*a*, 20*b* and 20*c* as well as site 2 participants 20*d* and 20*e*.

Also shown is a signaling network 40 located between the PBXs 32 and 34 and the voice teleconference bridge 12. The signaling network 40 is used for signaling for establishing participant/meeting sessions and conferencing feature requests. In a particular embodiment the signaling network 40 comprises an Internet Protocol (IP) network.

Both of the PBX's 32 and 34 are made aware in such as way so the PBXs 32 and 34 can handle some subset of conference needs without all parties needing to connect directly to the conference bridge (i.e. through a separate port on the bridge). If multiple callers are calling into the same meeting/conference on the same bridge (a common occurrence), then the PBX filters these calls and performs a subset of the conferencing of those parties locally (thereby saving on trunk and conference bridge resources). The PBX also has an "intelligent link" (e.g., a signaling network such as an IP network) to the conference server/bridge to inform the bridge of callers added to a conference locally (i.e. without actually extending a separate call to the bridge). If the conference is one hundred percent local, no call actually needs to be made into the conference bridge, as the PBX will be used for the conference (if any conference features are invoked, such as recording, then the PBX could be made intelligent enough to add the bridge to the conference).

The solution of utilizing the PBX for local conferencing needs efficiently reuses resources in the PBX that are already designed to support conferencing functions. Alternate distributed conferencing solutions don't take advantage of the existing PBX resources. By utilizing the PBX to conference local parties, only one port is tied up on the conference bridge itself rather than one per caller. Since only one call is extended out to the conference bridge from a local site, this may also result in toll (call) savings as well. In FIG. 2, the trunk circuit and bridge port savings include savings of two trunk circuits from PBX 32 and one trunk circuit from PBX 34, as well as a savings of three ports on teleconference bridge 12.

While the above example involved a small number of participants, the advantages are more pronounced with larger conferences and participants. Embodiments of the present invention can handle the typically more limited conferencing functions in the PBX with respect to the conference bridge (e.g. 6 party conferencing in PBX vs. 100's/1000's of parties in the main bridge). Thus, if the PBX supports n-party bridging, then there is still an (n−1) savings factor on trunk circuits, because (n−1) callers can be connected together in the PBX and share a single trunk connection to the bridge. (note: its (n−1) because the trunk itself counts as one party in the conference, leaving n−1 real callers). There could, of course, be multiple trunk connections to the bridge from the same PBX for the same conference. For example, if fifteen conferees are calling into the same conference from the same PBX, and the PBX has a 6-party conference limit, then the PBX could create a total of three six-party conference calls (each with five real participants and one trunk) and three trunk circuit connections to the main bridge. There is still a five to one savings factor involved in trunk circuits, main bridge ports, and toll charges, if applicable, for this example.

As discussed above, if all the parties in the conference are local, then no trunk circuit to the conference bridge is needed to carry any voice media path. This is, of course, valid until another participant joins the conference later (either from a different PBX or via direct connection to the PSTN, or from the same PBX but the number of conferees exceeds the PBX's capacity to conference all parties together). To make this part of the patent idea work, the "intelligent link" functionality is required, so that if the conference bridge determines that a voice connection to the PBX is required (due to any of the above conditions), then it signals the PBX to establish that connection. Conversely, the bridge could signal the PBX to tear down the connection when it is no longer required (i.e. conference transitions from a distributed nature to all local parties within the PBX's conference limits).

Figure 3:
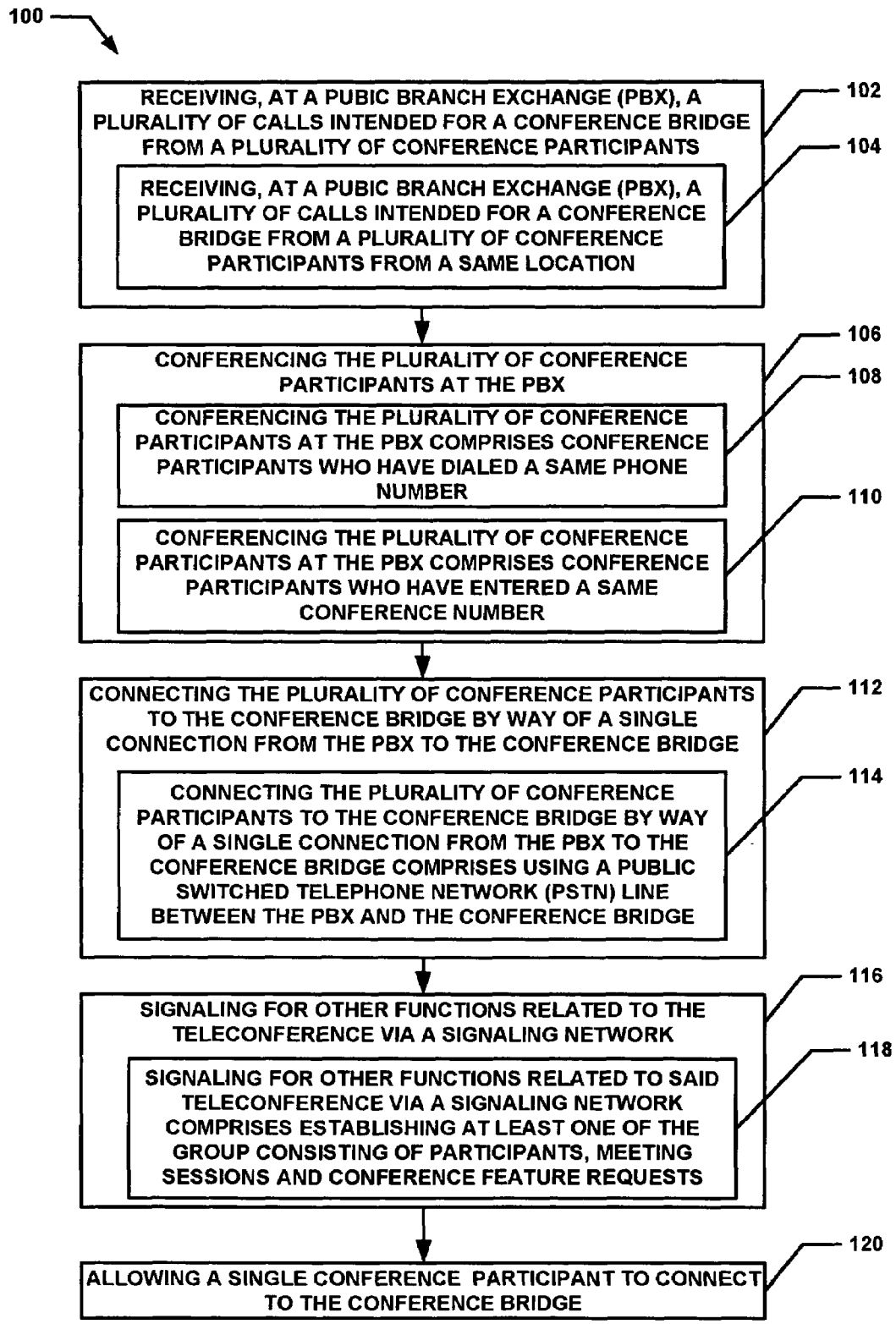
FIG. 3 comprises a flow diagram of a particular embodiment of a method of performing distributed conferencing in accordance with embodiments of the invention.

A flow chart of the presently disclosed method is depicted in FIG. 3. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 100 of performing distributed conferencing is shown. The method begins with processing block 102 which discloses receiving, at a Public Branch Exchange (PBX), a plurality of calls intended for a conference bridge from a plurality of conference participants. The calls are from the conference participants that intent to participate in a teleconference. As stated in processing block 104, in some instances the receiving, at a Public Branch Exchange (PBX), a plurality of calls intended for a conference bridge from a plurality of conference participants comprises receiving, at a Public Branch Exchange (PBX), a plurality of calls intended for a conference bridge from a plurality of conference participants from a same location.

Processing continues with processing block 106 which recites conferencing the plurality of conference participants at the PBX. The PBX's are made aware in such a way so the PBXs can perform some subset of conference needs without all parties needing to connect directly to the conference bridge (i.e. through a separate port on the bridge). If multiple callers are calling into the same meeting/conference on the same bridge (a common occurrence), then the PBX filters these calls and does some subset of the conferencing of those parties locally (thereby saving on trunk and conference bridge resources). The PBX also has an "intelligent link" (e.g., a signaling network such as an IP network) to the conference server/bridge to inform the bridge of callers added to a conference locally (i.e. without actually extending a separate call to the bridge). As shown in processing block 108 the conferencing the plurality of conference participants at the PBX comprises conference participants who have dialed a same phone number. As shown in processing block 110 the conferencing the plurality of conference participants at the PBX comprises conference participants who have entered a same conference number.

Processing block 112 discloses connecting the plurality of conference participants to the conference bridge by way of a single connection from the PBX to the conference bridge. Since the PBX itself is performing a first level of conferencing, only a single line and set of ports are required to connect certain n number of participants to the teleconference. As shown in processing block 114 the connecting the plurality of conference participants to the conference bridge by way of a single connection from the PBX to the conference bridge comprises using a Public Switched Telephone Network (PSTN) line between the PBX and the conference bridge.

Processing block 116 states signaling for other functions related to the teleconference via a signaling network. The signaling network 40 is used for signaling for establishing participant/meeting sessions and conferencing feature requests, as shown in processing block 118. In a particular embodiment the signaling network 40 comprises an Internet Protocol (IP) network.

Processing block 120 recites allowing a single conference participant to connect to the conference bridge. Since this call does not require a PBX, there is no first level conferencing to be done and the caller can connect directly to the PSTN.

Figure 4:
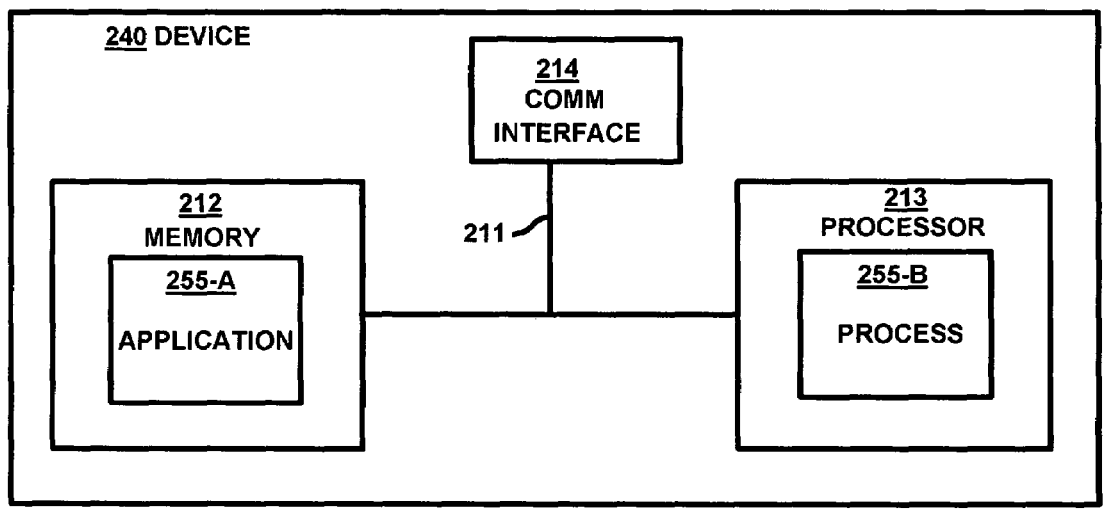
FIG. 4 illustrates an example computer system architecture for a computer system that performs performing distributed conferencing in accordance with embodiments of the invention.

FIG. 4 illustrates example architectures of a computer system (PBX) that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of performing distributed conferencing comprising:
receiving, at a Public Branch Exchange (PBX), a plurality of calls intended for a conference bridge from a plurality of conference participants as part of a teleconference;
conferencing said plurality of conference participants at said PBX by filtering calls at the PBX; and
connecting said plurality of conference participants to said conference bridge by way of a single connection from said PBX to said conference bridge, connecting said plurality of conference participants including using a Public Switched Telephone Network (PSTN) line between said PBX and said conference bridge, the single connection being a trunk circuit connecting to a single port of the conference bridge;
transmitting an identification of conference participants added to the conference at the PBX by signaling the conference bridge over an Internet Protocol (IP) network; and
transmitting conferencing feature requests from conference participants at the PBX to the conference bridge via the IP network.

2. The method of claim 1 further comprising signaling for other functions related to said teleconference via the IP network.

3. The method of claim 1 wherein said conferencing said plurality of conference participants at said PBX comprises at least one of conference participants who have dialed a same phone number and conference participants who have entered a same conference number.

4. The method of claim 1 further comprising allowing a single conference participant to connect to said conference bridge.

5. The method of claim 1 wherein said receiving, at a Public Branch Exchange (PBX), a plurality of calls intended for a conference bridge from a plurality of conference participants comprises receiving, at a Public Branch Exchange (PBX), a plurality of calls intended for a conference bridge from a plurality of conference participants from a same location.

6. The method of claim 1 wherein said signaling for other functions related to said teleconference via the IP network comprises establishing at least one of the group consisting of participants, meeting sessions and conference feature requests.

7. The method of claim 1, wherein connecting said plurality of conference participants to said conference bridge by way of the single connection from said PBX to said conference bridge occurs in response to receiving a conferencing feature request to record the teleconference.

8. The method of claim 1, wherein connecting said plurality of conference participants to said conference bridge by way of the single connection from said PBX to said conference bridge occurs in response to receiving a request from a conference participant calling from a second PBX to join the teleconference.

9. The method of claim 8, further comprising:
in response to identifying that the teleconference has transitioned from having conference participants from more than one PBX to having conference participants from only the PBX, sending instructions to the PBX, via the IP network, to tear down the single connection between the PBX and the conference bridge to continue the teleconference at the PBX without using the conference bridge.

10. The method of claim 9, further comprising:
identifying a maximum number of conference participants that can be grouped at the PBX to share a given single connection for connecting to the bridge via the given single connection;
creating multiple respective sub conference groups at the PBX sufficient for the plurality of calls, each respective sub conference group including a number of participants that does not exceed the maximum number; and
connecting each respective sub conference group to said conference bridge by way of a respective single connection.

11. A non-transitory computer readable medium having computer readable code thereon for performing distributed conference, the medium comprising:
instructions for receiving, at a Public Branch Exchange (PBX), a plurality of calls intended for a conference bridge from a plurality of conference participants as part of a teleconference;
instructions for conferencing said plurality of conference participants at said PBX by filtering calls at the PBX; and
instructions for connecting said plurality of conference participants to said conference bridge by way of a single connection from said PBX to said conference bridge, the instructions for connecting said plurality of conference participants including using a Public Switched Telephone Network (PSTN) line between said PBX and said conference bridge, the single connection being a trunk circuit connecting to a single port of the conference bridge;
instructions for transmitting an identification of conference participants added to the conference at the PBX by signaling the conference bridge over an Internet Protocol (IP) network; and
instructions for transmitting conferencing feature requests from conference participants at the PBX to the conference bridge via the IP network.

12. The non-transitory computer readable medium of claim 11 further comprising instructions for signaling for other functions related to said teleconference via the IP network, wherein said instructions for signaling for other functions related to said teleconference via the IP network comprises instructions for establishing at least one of the group consisting of participants, meeting sessions and conference feature requests.

13. The non-transitory computer readable medium of claim 11 wherein said instructions for conferencing said plurality of conference participants at said PBX comprises instructions for conferencing at least one of said plurality of conference participants who have dialed a same phone number and said plurality of conference participants who have entered a same conference number.

14. The non-transitory computer readable medium of claim 11 further comprising instructions for allowing a single conference participant to connect to said conference bridge.

15. The non-transitory computer readable medium of claim 11 wherein said instructions for receiving, at a Public Branch Exchange (PBX), a plurality of calls intended for a conference bridge from a plurality of conference participants comprises instructions for receiving, at a Public Branch Exchange (PBX), a plurality of calls intended for a conference bridge from a plurality of conference participants from a same location.

16. A Public Branch Exchange (PBX) system comprising:
a memory;
a processor;
a communications interface;
an interconnection mechanism coupling the memory, the processor and the communications interface; and
wherein the memory is encoded with an application providing distributed conferencing, that when performed on the processor, provides a process for processing information, the process causing the PBX to perform the operations of:
receiving a plurality of calls intended for a conference bridge from a plurality of conference participants as part of a teleconference;
conferencing said plurality of conference participants by filtering calls; and
connecting said plurality of conference participants to said conference bridge by way of a single connection from said PBX to said conference bridge, connecting said plurality of conference participants including using a Public Switched Telephone Network (PSTN) line between the PBX system and said conference bridge, the single connection being a trunk circuit connecting to a single port of the conference bridge;
transmitting an identification of conference participants added to the conference at the PBX system by signaling the conference bridge over an Internet Protocol (IP) network; and
transmitting conferencing feature requests from conference participants at the PBX system to the conference bridge via the IP network.

17. The PBX of claim 16 further comprising signaling for other functions related to said teleconference via the IP network.

18. The PBX of claim 16 wherein said conferencing said plurality of conference participants comprises at least one of conference participants who have dialed a same phone number and conference participants who have entered a same conference number.

19. The PBX of claim 16 wherein said receiving a plurality of calls intended for a conference bridge from a plurality of conference participants comprises receiving, a plurality of calls intended for a conference bridge from a plurality of conference participants from a same location.

20. The PBX of claim 16 wherein said signaling for other functions related to said teleconference via the IP network comprises establishing at least one of the group consisting of participants, meeting sessions and conference feature requests.

* * * * *